United States Patent [19]

DiPierro et al.

[11] 4,335,487
[45] Jun. 22, 1982

[54] SUPPORTING HANDLE

[75] Inventors: Michael A. DiPierro, Shrewsbury, Mass.; David E. Roche, Nashua, N.H.

[73] Assignee: The Birger Company, Westboro, Mass.

[21] Appl. No.: 110,380

[22] Filed: Jan. 8, 1980

[51] Int. Cl.³ .............................................. A47B 95/02
[52] U.S. Cl. ...................................... 16/126; 190/57; 264/527
[58] Field of Search .................. 16/126, 125; 264/534, 264/524, 527; 190/57, 58 R, 52 A

[56] References Cited

U.S. PATENT DOCUMENTS 3,317,955  5/1967  Schurman et al. ............. 264/527 X

FOREIGN PATENT DOCUMENTS 38-11831  7/1963  Japan .................................... 264/527
1391147  4/1975  United Kingdom .................. 16/126

Primary Examiner—Andrew V. Kundrat
Attorney, Agent, or Firm—Charles Hieken

[57] ABSTRACT

A U-shaped cooler handle of high density polypropylene plastic has three rigid hollow blow-molded portions with adjacent portions interconnected by solid flexible webs at the corners.

2 Claims, 2 Drawing Figures

SUPPORTING HANDLE

BACKGROUND OF THE INVENTION

The present invention relates in general to supporting and more particularly concerns a novel plastic handle and method of manufacturing it characterized by a sharp reduction in weight and mold costs without sacrificing strength while increasing the ease of manufacture.

The present invention is especially useful as a handle for a cooler or other container. The prior art approach to making these handles involved injection molding a solid U-shaped handle or molding it straight and hot forming it into the U-shape. The mold for such a handle typically costs about $50,000, and each handle uses about 400 grams of plastic material.

It is an important object of this invention to provide an improved plastic supporting structure and method of manufacture.

It is another object of the invention to achieve the preceding object with a handle that uses significantly less material while providing adequate support.

It is another object of the invention to achieve one or more of the preceding objects with molds that are significantly less complex and expensive.

It is still another object of the invention to achieve one or more of the preceding objects using blow molding techniques.

It is still a further object of the invention to achieve one or more of the preceding objects by molding the structure flat in such a manner that after molding it may readily be formed into noncollinear segments.

SUMMARY OF THE INVENTION

According to the invention, there is a unitary structure of plastic material formed of at least two hollow rigid portions, preferably blow molded, interconnected by a solid flexible segment of the plastic material that readily bends to form a corner of the support structure. In a specific form of the invention as a handle, there are three blow-molded rigid hollow portions alternating with two flexible solid segments of the plastic material, typically high density polyethylene, polypropylene, or other plastics, that readily bends to form corners of a U-shaped handle for a cooler.

According to the process of the invention, a flat blow mold includes air injection needles that form the small openings in each hollow portion for injecting air therein during molding and closely spaced opposed faces for pinching together the plastic material that forms the solid interconnecting segments and preventing these segments from expanding when air is injected through the needles to inflate hollow portions. A tubular parison of hot soft plastic material is positioned between the opposed mold halves, the halves are brought together so that the needles penetrate the parison and portions of the parison are pinched together to form the solid segments interconnecting adjacent hollow portions. Compressed air enters through the needles to inflate the hollow portions. The mold is then cooled. The hardened support structure of collinear alternating hollow and solid portions is removed from the mold and then bent at the solid portions to form the handle or other support structure of noncollinear hollow portions interconnected by the solid portions at each corner.

Numerous other features, objects and advantages of the invention will become apparent from the following specification when read in connection with the accompanying drawing in which:

DETAILED DESCRIPTION OF PREFERRED EMBODIMENTS

Figure 1:
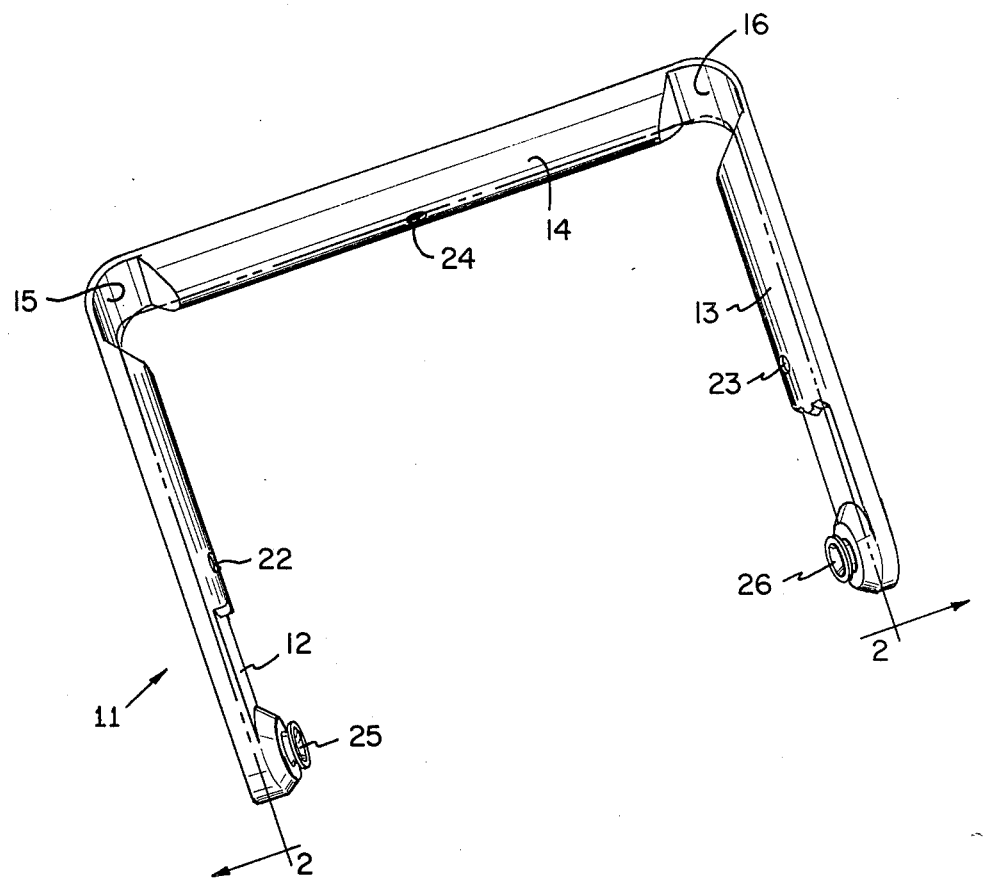
FIG. 1 is a perspective view of a U-shaped handle according to the invention.

With reference now to the drawing and more particularly FIG. 1 thereof, there is shown a perspective view of a cooler handle 11 according to the invention. Corresponding elements are identified by the same reference symbol throughout the drawing. The U-shaped handle 11 is a unitary structure typically made of high density polyethylene having end hollow portions 12 and 13 connected to hollow intermediate portion 14 by solid corner portions 15 and 16, respectively. Blow-molded hollow portions 12, 13 and 14 include openings 22, 23 and 24, respectively, which received a needle for admitting compressed air during the blow molding operation that expands the plastic and produces the hollow region inside. End portions 12 and 13 are formed with studs 25 and 26, respectively, for insertion into a mating hole of a cooler or other device to be supported by the handle 11.

Figure 2:
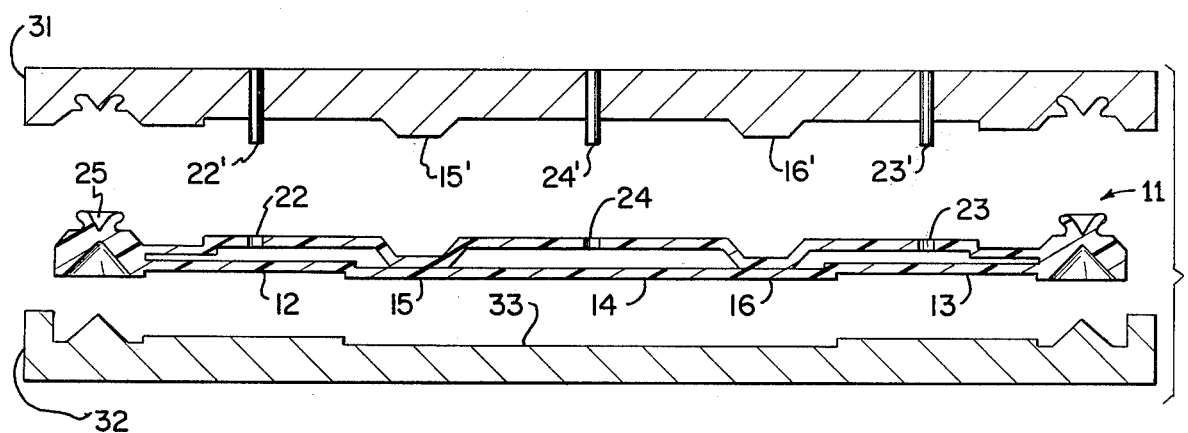
FIG. 2 is a lengthwise unfolded sectional view through section 2—2 of the handle of FIG. 1 together with an outline of the blow mold used in forming the handle.

Referring to FIG. 2, there is shown a sectional view through section 2—2 of FIG. 1 with the handle 16 flattened together with a sectional view of upper mold 31 and lower mold 32 used in the blow molding process according to the invention. Upper mold portion 31 and lower mold portion 32 have opposed faces corresponding to the upper and lower faces, respectively, of handle 11 when flat as shown. Upper mold portion 31 also includes needles 22', 23' and 24' about which openings 22, 23 and 24, respectively, are formed during the blow molding process. Depending faces 15' and 16' of upper mold portion 31 are separated from upper surface 33 of lower mold 32 substantially by the thickness of solid corner portions 15 and 16, respectively.

The blow molding process is carried out in conventional manner. However, molten plastic material fills the gaps between 15' and 33 and between 16' and 33 while the parison of molten plastic in remaining regions is inflated as compressed air is admitted through needles 22', 23' and 24' and forms a layer of plastic material around the cavity walls to produce the hollow regions indicated in portions 12–14 while corner portions 15 and 16 formed by squeezed-together portions of the parison remain solid. The mold is then cooled, and the finished handle removed ready for bending to form the U-shaped handle of FIG. 1 without any special tools or finishing required.

The invention is characterized by a number of advantages, especially when compared with conventional solid handles formed by injection molding. The blow mold is considerably less expensive. Thus, the blow mold of FIG. 2 to produce the handle of FIG. 1 costs of the order of $7500 as compared to the approximate $50,000 cost of an injection mold to produce a comparable solid handle. Considerably less material is used for the handle. Thus the handle according to the invention of FIG. 1 uses only 125 grams of material as compared with 400 grams for a comparable solid injected molded handle. Yet the light handle according to the invention still provides adequate structural strength, and the exemplary embodiment accompanying this application is capable of carrying a load of about 150 pounds.

There is attached Drawing No. 1A showing a detailed mechanical drawing of a commercial embodiment of the invention.

There has been described novel plastic apparatus for supporting and techniques for fabrication having a number of advantages and features. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A unitary plastic supporting structure comprising,
   at least first and second rigid hollow portions of plastic material interconnected by a flexible solid portion of said plastic material,
   said unitary plastic supporting structure being blow molded and formed with openings that surrounded needles during the blow molding process and having at least a third rigid hollow portion interconnected to said second rigid hollow portion by a second flexible solid portion of said plastic,
   whereby said supporting structure may be formed into a U-shaped handle with said solid portions forming corners and said first and third portions having their free ends terminating in supporting means.

2. Plastic supporting apparatus in accordance with claim 1 wherein said first and third portions are of substantially the same length and formed with end studs for engagement with a hole on apparatus to be supported by said handle.

* * * * *